US012699482B2

(12) United States Patent
Bushnell

(10) Patent No.: US 12,699,482 B2
(45) Date of Patent: *Aug. 4, 2026

(54) ELECTRONIC DEVICE TOUCH DETECTION

(71) Applicant: Apple Inc., Cupertino, CA (US)

(72) Inventor: Tyler S. Atura Bushnell, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/097,006

(22) Filed: Apr. 1, 2025

(65) Prior Publication Data

US 2025/0362771 A1 Nov. 27, 2025

Related U.S. Application Data

(63) Continuation of application No. 18/671,945, filed on May 22, 2024, now Pat. No. 12,287,936.

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01); *G06F 2203/04104* (2013.01)

(58) Field of Classification Search
CPC ................. G06F 3/04166; G06F 3/044; G06F 2203/04104
See application file for complete search history.

(56) References Cited

U.S. PATENT DOCUMENTS

| | | | |
|---|---|---|---|
| 11,157,109 B1 | 10/2021 | Shorten et al. |
| 11,269,457 B1 | 3/2022 | Hollands et al. |
| 12,189,899 B2 | 1/2025 | Shorten et al. |
| 12,287,936 B1 | 4/2025 | Bushnell |
| 2022/0011920 A1 | 1/2022 | Shorten et al. |

*Primary Examiner* — Michael Pervan
(74) *Attorney, Agent, or Firm* — Dorsey & Whitney LLP

(57) ABSTRACT

An electronic device can include a touch sensitive display and an electrode electrically isolated from the touch sensitive display. The electrode can be configured to receive a first signal associated with performing a first function of the electronic device. In some examples, the electronic device can include a controller in electrical communication with the touch sensitive display and the electrode. The controller can be configured to perform a second function via the electrode, the second function including driving a second signal to the electrode when the electrode and the touch sensitive display are touched simultaneously. The second signal can have a characteristic distinguishable from naturally occurring capacitive noise detected by the touch sensitive display.

20 Claims, 6 Drawing Sheets

ELECTRONIC DEVICE TOUCH DETECTION

CROSS-REFERENCE TO RELATED APPLICATIONS

This is a continuation of U.S. patent application Ser. No. 18/671,945, filed 22 May 2024, and entitled "ELECTRONIC DEVICE TOUCH DETECTION," the entire disclosure of which is hereby incorporated by reference.

FIELD

The described embodiments relate generally to electronic devices. In particular, the present disclosure relates to discerning user input for electronic devices.

BACKGROUND

Recent advances in portable computing have enabled increased functionality and adaptability in a variety of electronic devices. As the capabilities of portable devices increase, wearable devices, in addition to other electronic devices, are being implemented to be used in a wide range of situations and environments. The lack of versatility in modern electronic devices can result in devices that lose functionality in certain environments. For example, electronic devices with touch-sensitive displays can suffer lack of function in wet environments. More specifically, water and other substances that come into contact with touch-sensitive displays can interfere with a device's ability to confirm a user's input, making operation of the electronic device difficult. Additionally, electronic devices commonly perceive non-user substances as user input, further obstructing the operation of many electronic devices.

As such, there is need to develop electronic devices that can efficiently operate in certain environments while distinguishing user input from non-user substances.

SUMMARY

In accordance with one or more examples of the following disclosure, an electronic device can include a touch sensitive display and an electrode electrically isolated from the touch sensitive display. Additionally, the electrode can be configured to receive a first signal associated with performing a first function of the electronic device. In some examples, the electronic device can include a controller in electrical communication with the touch sensitive display and the electrode. The controller can be configured to perform a second function via the electrode, the second function including driving a second signal to the electrode when the electrode and the touch sensitive display are touched simultaneously. The second signal can have a characteristic distinguishable from naturally occurring capacitive noise detected by the touch sensitive display.

In some examples, the electronic device can further include a housing. The housing can define an external surface and can be electrically isolated from the touch sensitive display screen. In at least one example, the controller can be disposed within the housing, and the electrode can include the housing. Additionally, the electronic device can further include a housing coupled to the touch sensitive display. In some examples, the electrode can also include a button electrically isolated from, and manipulate-able relative to, the housing. In some examples, the first function of the housing can include an antenna function.

In one or more examples of the present disclosure, the electronic device can include a housing coupled to the touch sensitive display. In at least one example, the electronic device can further include a rear cover coupled to the housing opposite the touch sensitive display, where the rear cover can include the electrode. In some examples, the first function of the rear cover can include detecting if a user is donning the electronic device.

In at least one example, the characteristic of the signal can include a frequency. In some examples, the naturally occurring capacitive noise can include a capacitive signal from a droplet of water disposed on the touch sensitive display.

In some examples, the touch sensitive display can define an external surface and the electrode can define an external surface. In one or more examples, the controller can be configured to drive the signal through the electrode to the touch sensitive layer when a user simultaneously touches the electrode and the touch sensitive display. In some examples, the controller can detect the characteristic through the touch sensitive display.

In one or more examples of the present disclosure, an electronic display device can include a display assembly including a touch sensor, an electrode, and a controller. In some examples, the controller can be in electrical communication with the touch sensor. Additionally, the electrode can be configured to drive a signal to the electrode, the signal having a characteristic distinguishable from capacitive noise detected by the touch sensitive display. In some examples, the controller can be configured to drive the signal to the display assembly when the electrode and the display assembly are simultaneously touched.

In some examples, the touch sensor can include a capacitive touch sensor. In some examples, the controller can include a driver configured to drive the signal to the electrode, and a receiver in electrical communication with the capacitive touch sensor and configured to detect the characteristic. In at least one example, the characteristic can include a voltage. Additionally, the characteristic can include a variable frequency.

In one or more examples of the present disclosure, a sensor assembly can include a capacitive touch display, an electrode defining an external surface electrically isolated from the display, and a controller. In some examples, the controller can be in electrical communication with the capacitive touch display and the electrode, the controller configured to drive a first signal to the electrode. In some examples, the first signal can include a first characteristic distinguishable by the controller from a second characteristic of a second signal detected from a water droplet on the capacitive touch display when a user initiates a contact of the capacitive touch display and the electrode. In some examples, the controller can be configured to distinguish a third characteristic from the second characteristic, where the third characteristic can include a feature of the contact.

In some examples, the feature of the contact can include a shape of the contact area between a finger of the user and the capacitive touch display. In additional examples, the feature of the contact can include the size of the contact area between the finger of the user and the capacitive touch display. In at least one example, the feature of the contact can include a location of the contact on the capacitive touch display. Additionally, the feature of the contact can include a force exerted on the capacitive touch display by the user. In some examples, the controller can be configured to use a machine learning algorithm to distinguish the third characteristic from the second characteristic. Furthermore, the capacitive touch display can be coupled to a housing, and the electrode can include a button manipulate-able relative to the housing.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
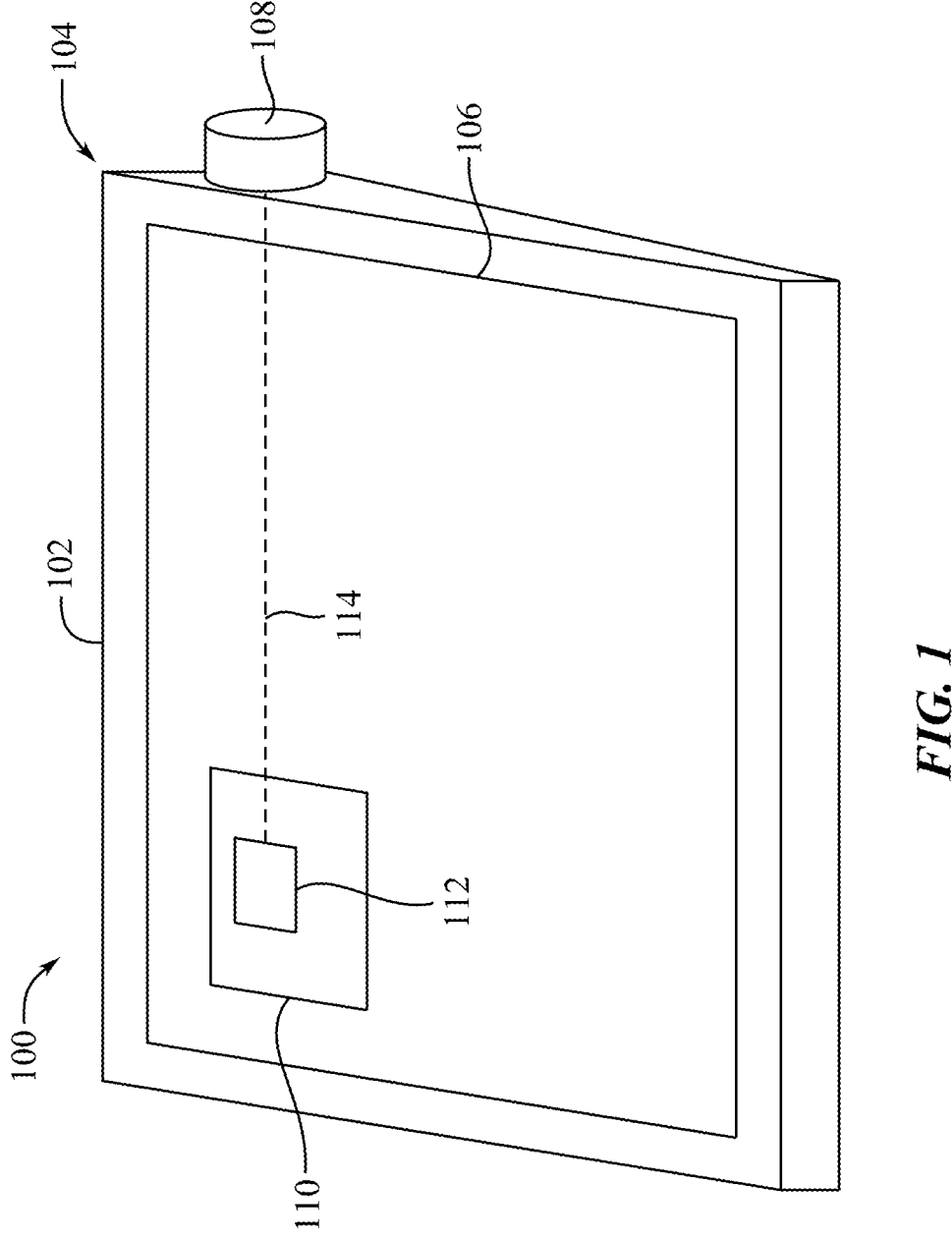
FIG. 1 shows a perspective view of the electronic device, according to one or more examples of the present disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure relates generally to electronic devices. More particularly, the present disclosure relates to discerning user input for electronic devices. In one or more examples of the present disclosure, an electronic device can include a touch-sensitive display, an electrode electrically isolated from the touch-sensitive display, and a controller in communication with the touch-sensitive display. In various examples, some components of the electronic device can be disposed within a housing.

Recent advances in portable computing have enabled increased functionality and adaptability in a variety of electronic devices. However, modern electronic devices can often lose functionality in certain environments. For example, electronic devices with touch-sensitive displays can suffer lack of function in wet environments. More specifically, substances, like water, in contact with touch-sensitive displays can interfere with a user's input, making operation of the electronic device difficult. Additionally, electronic devices commonly perceive non-user substances as user input, further obstructing the operation of many electronic devices. The present disclosure details an electronic device that can efficiently operate in adverse environments, such as wet environments, while distinguishing user input from non-user substances.

In some examples of the present disclosure, the electronic device includes an electrode and a controller that combine to confirm touch in a wet environment. Specifically, in some examples, the controller can be configured to drive a signal through the electrode to the touch-sensitive display when the user of the electronic device simultaneously touches the electrode and the touch-sensitive display, to confirm the touch. In some examples, the electrode can be electrically isolated from other components of the electronic device. Additionally, the electrode can be manipulate-able relative to the housing of the electronic device, allowing the electrode element to also serve as a functional component.

In some examples, the controller can be configured to receive the signal driven from the electrode through the user of the electronic device. In at least one example, the signal driven by the signal driver can include a characteristic distinguishable from naturally occurring capacitive noise detected by the touch sensitive display, for example naturally occurring capacitive noise from one or more water droplets on the display in a wet environment.

In some examples, the controller can include a receiver configured to detect the characteristic of the signal, where the receiver can be in electrical communication with the touch-sensitive display. In some examples, the characteristic of the signal can include a frequency. In additional examples, the signal can also include a variable voltage drop and/or a capacitance level that can be measured by the controller when the user touches the electrode and the touch-sensitive display. In some examples, this characteristic can be a first characteristic.

In one or more examples, the controller can be configured to detect signals from various substances in contact with the touch-sensitive display. In some examples, the controller can be configured to compare the first characteristic of the signal driven by the signal driver to a second characteristic of a signal received from a non-user substance, such as a water droplet. The controller can then associate the signal with the first characteristic with user input and the second characteristic with a non-user substance.

In at least one example, the controller can be configured to distinguish a third characteristic from the second characteristic, where the third characteristic can include a feature of the contact. In some examples, the feature of the contact can include a shape of the contact area between a finger of the user and the touch-sensitive display. In one or more examples, the feature of the contact fan further include the size of the contact area and the force exerted on the contact area. Additionally, the controller can be configured to use a machine learning algorithm to distinguish the third characteristic from the second characteristic.

The examples of the devices described herein can thus discern between a user initiated touch, for example a finger contacting a touchscreen, from the presence or contact of water droplets on the display. This discernment can occur naturally and easily without the user initiating a wet mode or other steps required to discern droplets from user touches.

These and other embodiments are discussed below with reference to FIGS. 1-6. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a perspective view of an electronic device 100, in accordance with one or more examples of the present disclosure. In some examples, the electronic device 100 can be a portable device. In at least one example, the electronic device 100 can be worn by a user. For example, the electronic device 100 can be a watch, or other device worn by a user. In additional examples, the electronic device 100 can be a device such as a phone, a tablet, a computer, or other portable electronic devices. In further examples, the electronic device 100 can be a sensor assembly.

In at least one example, the electronic device 100 can include a housing 102. In some examples, the housing of the electronic device 100 can be configured to house a number of different components. In some examples, the housing 102 can be a display assembly to house various components. In at least one example, the housing can surround various components disposed within the electronic device 100. In some examples, the housing 102 can be made out of various materials. In at least one example, the housing 102 can be constructed out of a non-conducting material. For example, the housing 102 can be constructed using various polymers, plastics, or other non-conducting materials. This can enable electrical charges and electrical signals to not propagate across the electronic device 100. Furthermore, the non-conducting construction of the housing 102 can electrically isolate the housing 102 from other components disposed within the electronic device 100.

Additionally, the housing 102 can be constructed in such a way that it can define an external surface 104 of the electronic device 100. In some examples, the external surface 104 of the electronic device 100 can wrap around the electronic device 100. In some examples, the external surface 104 can be configured to make contact with the user in various locations around the electronic device 100. Similar to the housing 102, the external surface 104 can be constructed so as to be non-conducting where it makes contact with the user of the electronic device 100.

In some examples of the present disclosure, the electronic device 100 can further include a touch-sensitive display 106. In some examples, the touch-sensitive display 106 can be disposed on the top of the electronic device 100. Additionally, the touch sensitive display 106 can be disposed such that the touch sensitive display 106 can further define a portion of the external surface 104. In at least one example, the touch-sensitive display can be electrically isolated from the housing 102. In some examples, the touch-sensitive display 106 can be disposed on the top of the electronic device 100. In this example, the touch-sensitive display 106 can define the external surface 104 of the top of the electronic device 100. This can enable the touch-sensitive display 106 to be accessible by the user of the electronic device 100.

In at least one example, the touch-sensitive display 106 can be configured to receive electrical signals from various sources. In some examples, the touch-sensitive display 106 can be configured to react when the user of the electronic device 100 touches the touch-sensitive display 106. In at least one example, the touch-sensitive display 106 can include a capacitive touch sensor. In at least one example, the capacitive touch sensor included in the touch-sensitive display 106 can enable the touch-sensitive display 106 to function as a capacitive touch display.

In some examples, the capacitive touch sensor capabilities of the touch-sensitive display 106 can be configured to react when detecting a capacitance associated with a touch of a user, where the touch of a user can be defined within a certain capacitance range. This can enable the user to interact with the electronic device 100 via the touch-sensitive display 106. This can further enable the electronic device 100 to more accurately detect a touch of the user in the presence of other elements in contact with the touch-sensitive display 106.

In some examples, the electronic device 100 can further include an electrode 108. In some examples, the electrode 108 can be a button, dial, crown, or similar kind of device. In some examples, the housing 102 can include the electrode 108. In some examples, the electrode 108 can extend from the housing 102. In this example, and similar to the touch-sensitive display 106, the electrode 108 can be constructed so as to define another portion of the external surface 104. This can enable the electrode 108 to be easily accessible by the user of the electronic device 100.

In examples of electrodes described herein, for example the electrode 108, the electrode can be configured to received inputs for a first function and then perform a second function different than the first function to distinguish between user-initiated touches and water droplets on the display 106. In examples where the button, dial, crown, or other manipulatable component of the device 100 serves as the electrode 108, the button, dial, crown, or other component can include first functions to receive input from a user (e.g., depressing the button or rotating the dial and/or crown). The first function of the button can include altering the display output, sending texts, scrolling through user-interface menus, and the like. The same electrode 108 button/dial/crown can then be used in a touch discernment function as described herein via a unique signal driven to the electrode 108.

In some examples, the housing 102 can be configured to perform a first function. In at least one example, the first function of the housing 102 can include an antenna function. In this example, the housing 102 can function as an antenna, or as part of an antenna assembly, for the electronic device 100. The housing 102 can be a resonator for an antenna assembly configured to send and receive signals. For example, the electronic device 100 can participate in wireless communication with a variety of smart devices via the use of the housing 102. In some examples, a second function of the housing 102 can include the use of the electrode 108. This housing 102 can then be used to drive the unique signals described herein as part of a touch discernment function.

Additionally, the electrode 108 can be constructed from a conductive material. In some examples, the electrode 108 can be electrically isolated from the housing 102. The electrode 108 can also be electrically isolated from the touch-sensitive display 106. This can enable the electrode 108 to be electrically isolated from the other components of the electronic device 100. In some examples, the housing 102 can be electrically isolated from the touch-sensitive display 106 and the housing 102 can be the electrode or include the electrode.

In some examples, the electronic device 100 can further include a controller 110. In one or more examples, the controller 110 can be an integrated circuit, where the integrated circuit can include a variety of circuit components. In some examples, the controller 110 can include processors, memory allocation units, antennas, and other electronic computing components. Additionally, the controller 110 can include a computer readable medium for storing instructions, that, when executed by a processor, can cause various components of the systems described herein to carry out a variety of functions described herein. In some examples, the controller 110 can be configured to carry out software functions, visual display functions, user-interface functions, and other functions described in the present disclosure. In some examples, the controller can be disposed within the housing 102 of the electronic device 100.

In at least one example, the controller 110 can be a kind of electronic computing device in electrical communication with the touch-sensitive display 106. In some examples, the controller 110 can be configured to receive electrical signals from the touch-sensitive display 106. In this manner, the user of the electronic device 100 can interact with the electronic device via manipulation of the touch-sensitive display 106. For example, the touch-sensitive display 106 can detect the capacitive touch of a user of the electronic device 100 and communicate relevant data from the user's contact with the touch-sensitive display 106 to the controller 110. The controller 110 can then process this contact as user input. This can enable the user to operate the electronic device 100 through at least a capacitive touch feature.

In some examples, the controller 110 can further include a signal driver 112 in electrical communication with the electrode 108. For example, the controller 110 can be electrically coupled to the electrode 108. In at least one example, the signal driver 112 can be a circuit component with the ability to send signals for the purpose of electrical communication. In some examples, the signal driver 112 can further include amplifiers, filters, power sources, and other components to assist the controller 110 in sending a signal via the signal driver 112.

In at least one example, the controller 110 can be configured to drive a signal 114 to the electrode 108. In some examples, the controller 110 can be configured to receive a signal associated with performing a first function. In at least one example, this first function of the electronic device 100 can be a function associated with normal operation of the electronic device 100. For example, the first function can be to determine when a user dons the electronic device 100. In another example, the first function can be related to receiving health data from the user.

In some examples, the controller 110 can be configured to drive the signal 114 to the controller 110 for performing a second function of the electronic device 100 different than the first function. In some examples, the second function can include discerning between a user-initiated touch on the touch-sensitive display 106 and a liquid in contact with the electronic device 100. In at least one example, the signal 114 can include a characteristic that can be distinguishable from naturally occurring capacitive noises detected by the touch-sensitive display 106, such as liquid on the touch-sensitive display 106. In some examples, the controller 110 can be configured to manipulate the signal driver 112 in order to vary the characteristics of the signal 114. More on the signal 114 with varying characteristics will be described in further detail throughout the present disclosure.

The components, configurations, and advantages described with reference to the device shown in FIG. 1 can be included alone or in combination with any other device or system described herein with reference to other figures. Likewise, components, configurations, and advantages described in other devices or systems with reference to other figures can be included alone or in combination with those of device shown and described with reference to FIG. 1.

Figure 2:
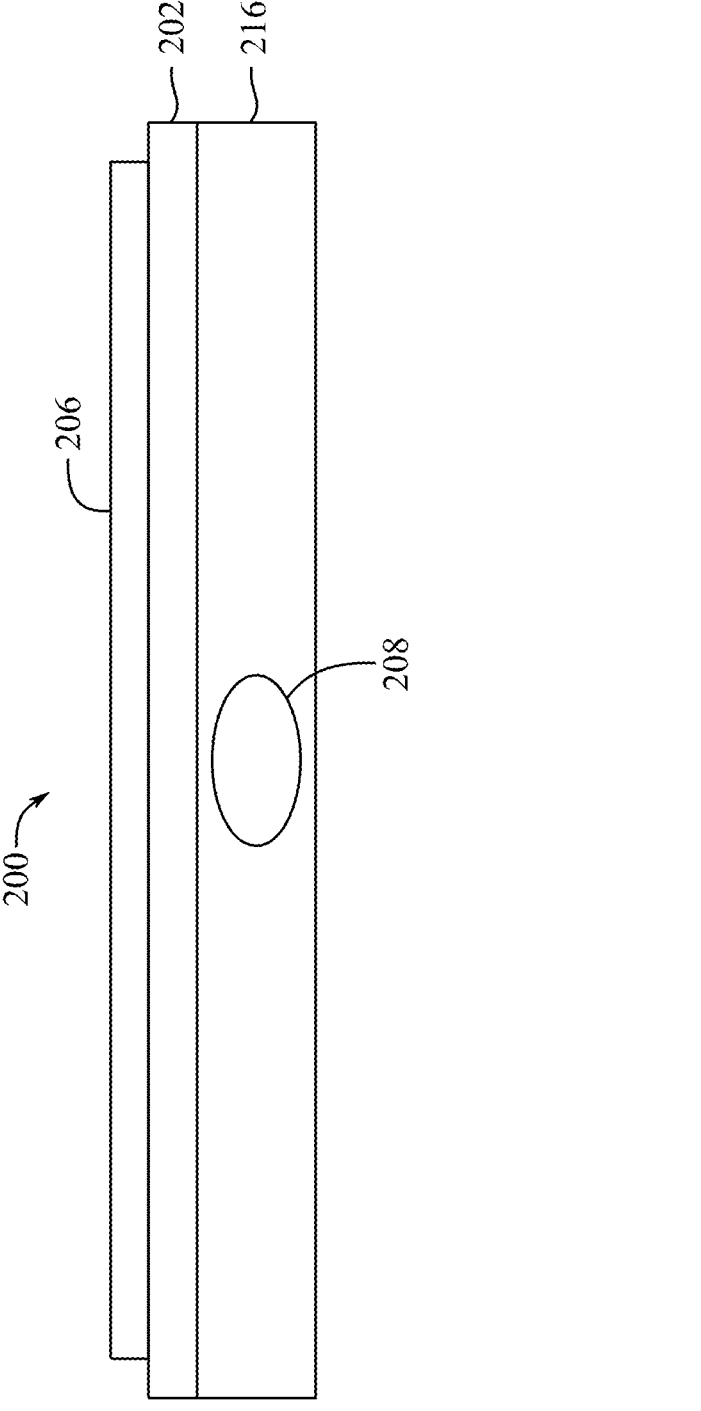
FIG. 2 shows a side view of the electronic device with focus on the electrode, according to one or more examples of the present disclosure.

FIG. 2 illustrates a side view of the electronic device 200, in accordance with one or more examples of the present disclosure. In some examples, the housing 202 can be coupled to the touch-sensitive display 206. In at least one example, a rear cover 216 can also be coupled to the housing 202 opposite the touch sensitive display 206, as shown in FIG. 2. In some examples, the rear cover 216 can be configured to wrap around the side of the electronic device 200 opposite the touch-sensitive display 206. In some examples, the rear cover 216 can also be configured to contact the user.

Figure 4:
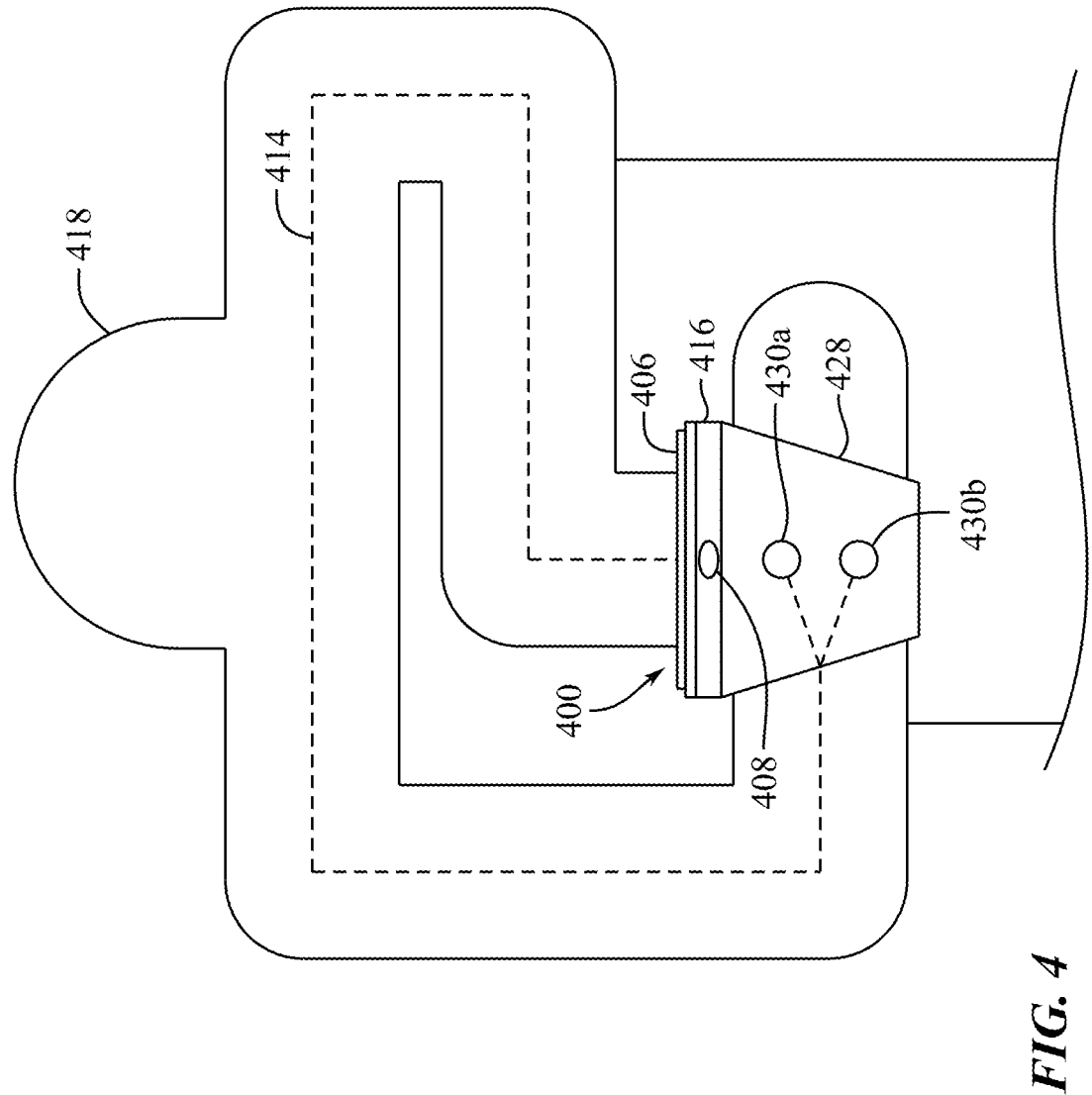
FIG. 4 shows a block diagram of a system of the electronic device, according to one or more examples of the present disclosure.

In some examples, the rear cover 216 can include a first function. In at least one example, the first function of the rear cover 216 can include detecting if a user is donning the electronic device 100. In this example, the rear cover 216 can sense when the user is in contact with the device. In some examples, a second function of the housing 102 can include the use of the signal (e.g. signal 114 in FIG. 1), as shown in FIG. 4 of the present disclosure.

Similar to the housing 202, the rear cover 216 can be constructed out of a conductive material or a non-conductive material. For example, the rear cover 216 can be constructed out of polymers, plastics, or other similar materials. This can enable the rear cover 216 to be electrically isolated from the various components disposed within the electronic device 200.

In some examples, the rear cover 216 can include the electrode 208. In some examples, and as shown in FIG. 1, the electrode 208 can be configured to extend from the electronic device 200 so as to enable easy access for a user. In some examples, the electrode 208 can further include a button. As described above, the electrode 208 can be constructed from a conductive material separate from the material of the housing 202 and the rear cover 216. This can enable the electrode 208 to be electrically isolated from at least the touch-sensitive display 206, housing 202, and the rear cover 216.

In at least one example, the electrode 208 can be configured to be handled by the user of the electronic device 200. In some examples, the electrode 208 can be manipulate-able relative to the housing 202. Additionally, the electrode 208 can be manipulate-able relative to the rear cover 216 of the electronic device 200. As FIG. 3 will further describe, this can enable the user to more easily access the electrode 208 when operating the electronic device 200, and can allow the electrode to provide additional functionality to the electronic device 200, such as an input.

The components, configurations, and advantages described with reference to the device(s) shown in FIG. 2 can be included alone or in combination with any other device or system described herein with reference to other figures. Likewise, components, configurations, and advantages described in other devices or systems with reference to other figures can be included alone or in combination with those of device shown and described with reference to FIG. 2.

Figure 3:
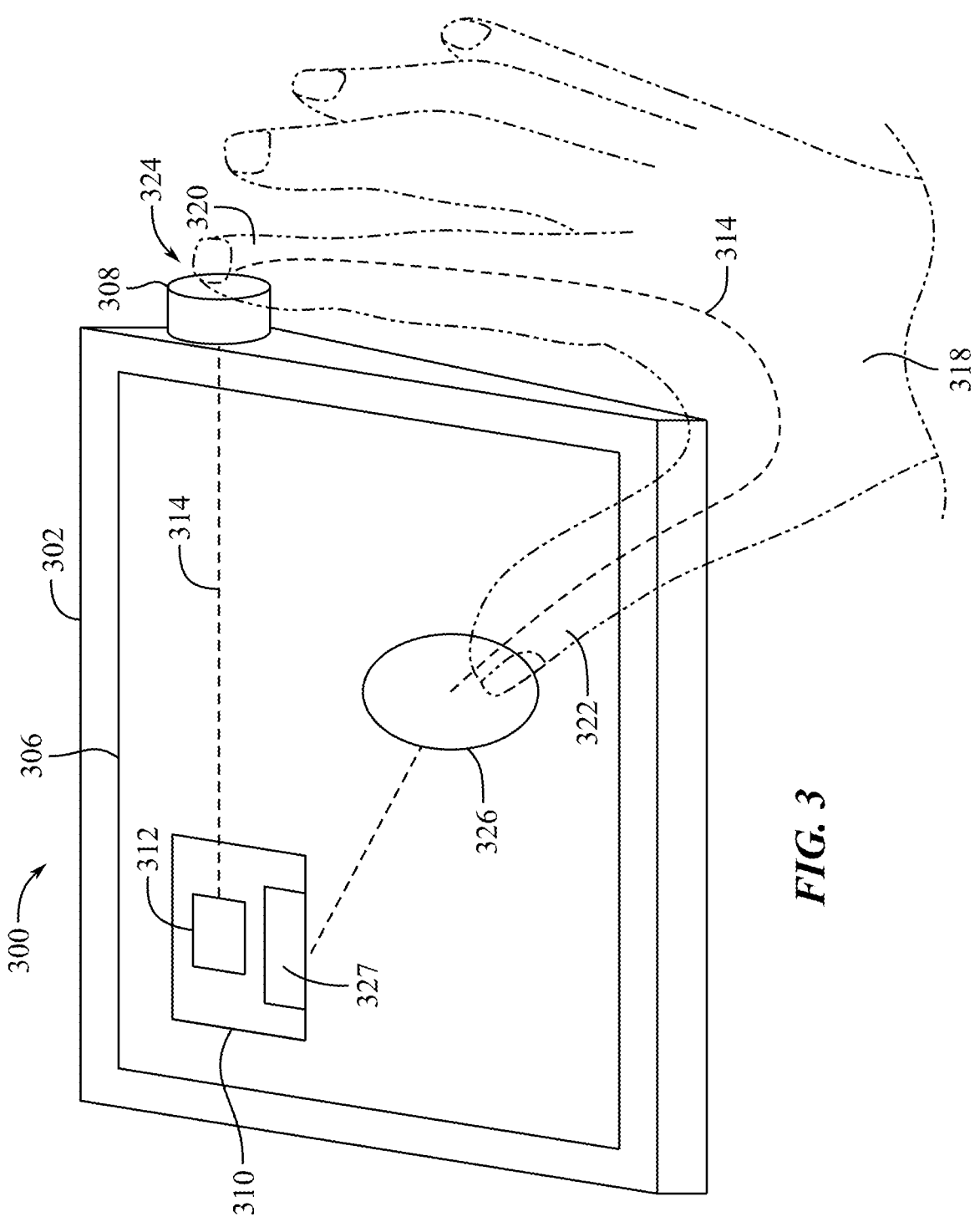
FIG. 3 shows another perspective view of the electronic device including the hand of a user, according to one or more examples of the present disclosure.

FIG. 3 illustrates a perspective view of a user 318 interacting with the electronic device 300, in accordance with one or more examples of the present disclosure. In some examples, the controller 310 can be in electrical communication with the electrode 308. In at least one example, the controller 310 can be configured to cause the signal driver 312 to send the signal 314 to the electrode 308. In at least one example, the signal 314 can include a unique characteristic that can separate the signal 314 from capacitive and/or electrical background experienced by various components of the electronic device 300. In some examples, the signal 314 can be configured to further propagate through the electrode 308. This can enable the user 318 to access the signal 314 via the electrode 308.

In some examples, the user 318 can place a first finger 320 on the electrode 308. In some examples, a first user contact 324 can include the area where the first finger 320 of the user 318 contacts the electrode 308. Additionally, the first user contact 324 can include a touch sensitive layer of the electrode 308. This touch sensitive layer can enable the user 318 to comfortably contact the electrode 308.

In some examples of the present disclosure, the signal 314 can propagate from the electrode 308 and into the first finger 320 via the first user contact 324. The user 318 can then place a second finger 322 on the touch-sensitive display 306. In some examples, a user display contact 326 can include the area where the second finger 322 contacts the touch-sensitive display 306. In doing so, the signal 314 can propagate through the user 318 and back into the electronic device 300. In some examples, the signal 314 can be propagate through the first finger 320 and the second finger 322 of the user 318 before being introduced back into the electronic device 300 via the touch-sensitive display 306. In this manner, the user 318 can initiate a completion of a circuit of the signal 314.

In at least one example, after completing the circuit of the signal 314, the controller 310 can detect the signal 314 through a receiver 327. In one or more examples, the receiver 327 can be disposed within the housing 302 of the electronic device 300. In some examples, the receiver 327 can be a part of the controller 310 configured to detect electrical signals, or a whole new component entirely. In some examples, the receiver 327 can include a combination of circuit components that can enable the detection of electrical signals. In at least one example, the receiver 327 can include electronic receptors, filters, amplifiers, and other circuit components that can assist the receiver 327 in detecting a wide range of electrical signals.

In some examples, the controller 310 can be configured to drive the signal 314 through the electrode 308 to the touch-sensitive layer when the user 318 simultaneously touches the electrode 308 and the touch-sensitive display 306. In some examples, the controller 310 can detect the unique characteristic of the signal 314 through the touch-sensitive display 306. In some examples, the unique characteristic of the signal 314 can be a variable frequency or a flutter of the frequency to distinguish it from the natural conditions. In other examples, the unique characteristic of the signal 314 can be a variable voltage drop across the signal 314 when the circuit of the signal 314 is completed when the user 318 touches the electrode 308 and the touch-sensitive display 306 simultaneously. In accordance with the present disclosure, the unique characteristic can include other parameters. Some of these additional parameters are described further in FIG. 6 below.

In some examples, the controller 310 can detect a touch made by the user 318 on the touch-sensitive display 306 via the unique characteristic of the signal 314. In some examples, other substances, like water, can be in contact with the surface of the touch-sensitive display 306 at the same time as the user 318 initiates contact with the touch-sensitive display 306. The controller 310 of the electronic device 300 can discern which contact is the user 318 via the unique characteristic of the signal 314 driven by the signal driver 312. For example, the contact on the touch-sensitive display 306 that includes the unique characteristic of the signal 314 can be discerned as the user 318. In some examples, the controller 310 can also be configured to use a machine learning algorithm to distinguish the user display contact 326 from other substances in contact with the touch-sensitive display 306.

The components, configurations, and advantages described with reference to the device shown in FIG. 3 can be included alone or in combination with any other device or system described herein with reference to other figures. Likewise, components, configurations, and advantages described in other devices or systems with reference to other figures can be included alone or in combination with those of device shown and described with reference to FIG. 3.

FIG. 4 illustrates a side view of the user 418 interacting with the electronic device 400. In some examples, the signal 414 can be configured to propagate through the user's arms and body, as opposed to just the user's hand, as shown in FIG. 3. In this example of FIG. 4, the user 418 may not need to contact the electrode 408 in order to complete the circuit of the signal 414 between the signal driver (e.g., signal driver 312 in FIG. 3) and the touch-sensitive display 406. In this example, the signal 414 can be driven through the user 418 through methods other than contacting the electrode 408.

In the example where the electronic device 400 is a watch, or other type of wrist-mounted device, the electronic device 400 can include a strap 428. In some examples, the strap can enable the electronic device 400 to be removably secured to the user 418. In at least one example, strap 428 can enable the rear cover 416 of the electronic device 400 to rest against the skin of the user 418. Additionally, the strap 428 can be configured to rest against the skin of the user 418.

In some examples of the present disclosure, the electronic device 400 can include additional electrical contact points that can be configured to enable the signal 414 to propagate through the user 418. In some examples, the strap 428 can include at least a first electrical contact 430*a* and a second electrical contact 430*b*. In some examples, the electrical contacts 430*a* and 430*b* can be similar to the electrode 408 in that they can be constructed out of conducting materials. In some examples, the electrical contacts 430*a* and 430*b* can be components such as diodes, heartbeat sensors, and other components found on conventional watches and similar devices. The electrical contacts 430*a* and 430*b* can enable the electronic device 400 to drive a stronger signal 414 through the user 418.

In at least one example, the signal driver (part 312 in FIG. 3) can be configured to drive the signal 414 to the electrical contacts 430*a* and 430*b*. In some examples, the electrical contacts 430*a* and 430*b* can rest against the user's skin. In this manner, the signal 414 can be configured to be driven by the signal driver 312 to the electrical contacts 430*a* and 430*b* and to propagate through the user 418. This can enable the electronic device 400 to drive the signal 414 into the user 418 when the user 418 is not in contact with the electrode 408.

In one or more examples, additional electrical contacts similar to the electrical contacts 430*a* and 430*b* can be disposed on the rear cover 416 of the electronic device 400 opposite the touch-sensitive display 406. In some examples, these additional electrical contacts can be constructed out of conducting materials and be electrically coupled to the signal driver 312. These additional electrical contacts can be diodes, heartbeat sensors, or other components found in current watches and similar devices. In some examples, the signal driver 312 can drive the signal 414 through the additional electrical contacts and into the user 418. These additional electrical contacts can enable a stronger signal 414 to propagate the greater distance through the user 418.

As shown in FIG. 4, the signal 414 can propagate through the body of the user 418 instead of just through the user's hand, as illustrated in FIG. 3. In this example, the user can make contact with the touch-sensitive display 406 with the hand not in contact with the electrical contacts 430a and 430b of the electronic device 400. When the user 418 makes contact with the touch-sensitive display 406, the circuit of the signal 414 can be completed. When the user 418 simultaneously contacts the electrical contacts 430a and 430b, the signal 414 can propagate through the body of the user 418 and back into the electronic device 400 via the touch-sensitive display 406.

In some examples, the receiver (e.g., receiver 327 in FIG. 3) can receive the signal 414 after the user 418 makes contact with the touch-sensitive display 406. In at least one example, the controller (e.g., controller 310 in FIG. 3) can be configured to receive the signal 414 via the receiver 327 such that the controller 310 can discern how the user 418 interacts with the electronic device 400 through the touch-sensitive display 406 without making contact with the electrode 408.

The components, configurations, and advantages described with reference to device shown in FIG. 4 can be included alone or in combination in any other device or system described herein with reference to other figures. Likewise, components, configurations, and advantages described in other devices or systems with reference to other figures can be included alone or in combination with those of device shown and described with reference to FIG. 4.

Figure 5:
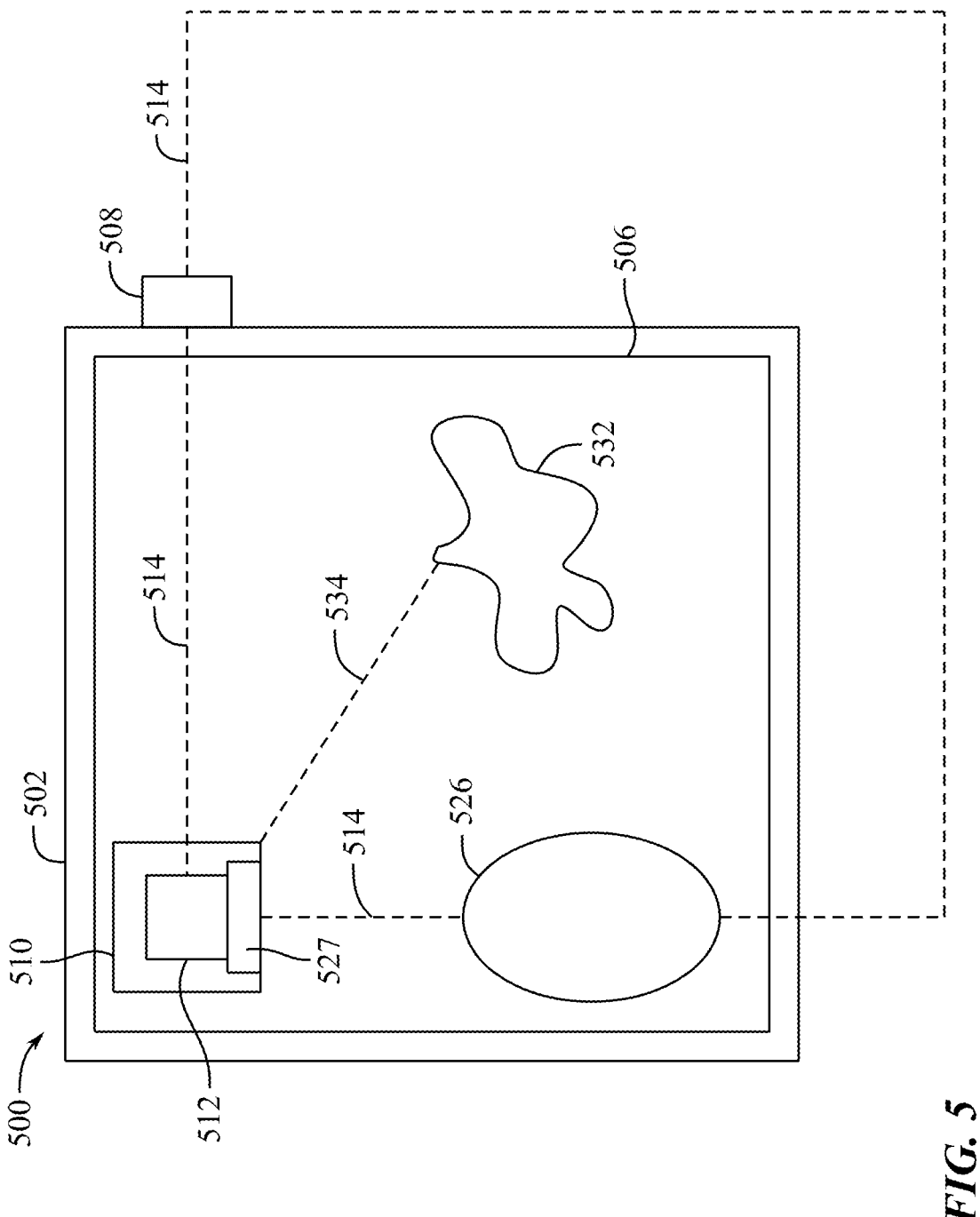
FIG. 5 shows a side view of the electronic device in conjunction with a user, according to one or more examples of the present disclosure.

FIG. 5 illustrates a top-down view of multiple substances in contact with the touch-sensitive display 506 of the electronic device 500, in accordance with one or more examples of the present disclosure. In some examples, various substances can come into contact with the electronic device 500. In some examples, these substances can induce capacitive signals that can be received by the electronic device 500. In at least one example, the user (e.g., user 418 in FIG. 4) can contact the touch-sensitive display 506 through the user display contact 526. In some examples, other substances can come into contact with the electronic device 500. FIG. 5 shows an example where water contacts the touch-sensitive display 506 through a water droplet 532. In some examples, the naturally occurring capacitive noise can include a capacitive signal from a droplet of water disposed on the touch-sensitive display 506.

In some examples, the receiver 527 can receive signals from the user display contact 526 as well as other contacts on the touch-sensitive display 506 such as the water droplet 532. In one or more examples, the controller 510 can be configured to discern the user display contact 526 from the water droplet 532 and other non-user substances in contact with the electronic device 500. This can be enable the user 418 to efficiently operate the electronic device 500 in a variety of situations. For example, with the controller 510 able to distinguish the user display contact 526 from other contacts, the user 418 can operate the electronic device 500 in wet conditions, where portions of the touch-sensitive display 506 are in contact with water.

In some examples, the controller 510 can be configured to distinguish the user display contact 526 from other contacts through a variety of methods. Some of the methods described can further assist the controller 510 to distinguish the user display contact 526 from other contacts, even if the user display contact 526 has a similar capacitance as one or more substances disposed on the touch-sensitive display 506.

In one or more examples, the controller 510 can be in electrical communication with the touch-sensitive display 506 and the electrode 508. In some examples, the controller 510 can further be configured to drive the signal 514 to the electrode 508. In one or more examples, the signal 514 can include a first characteristic distinguishable by the controller 510 from a second characteristic of a second signal 534 detected from the water droplet 532 on the touch-sensitive display 506 when the user 418 initiates a contact of the touch-sensitive display 506 and the electrode 508, thus completing the circuit of the signal 514 and enabling the controller 510 to receive the signal 514. In at least one example, the controller 510 can be configured to detect where the signal 514 is received relative to the touch-sensitive display 506. In this manner, the controller 510 can further be configured to recognize this area as the user display contact 526 rather than a non-user substance like the water droplet 532.

In at least one example, the first characteristic of the signal 514 can include various parameters that can enable the controller 510 to distinguish the user display contact 526 from other substances contacting the touch-sensitive display 506. In some examples, the first characteristic of the signal 514 can include a variable frequency. For example, the signal driver 512 can drive the signal 514 at a certain frequency that is not found naturally in substances that can contact the touch-sensitive display 506. In some examples, this frequency can be detected by the controller 510 via the receiver 527. This can further separate the user display contact 526 from other contacts on the touch-sensitive display 506 such as the water droplet 532.

In some examples, the first characteristic of the signal 514 can include a voltage drop that can be detected by the controller 510. In some examples, the signal driver 512 can drive the signal 514 with a certain level of voltage. When the user 418 completes the circuit of the signal 514 by simultaneously contacting the electrode 508 and the touch-sensitive display 506, the signal 514 can be grounded, thus enabling the controller 510 to read the voltage drop of the signal 514. In this example, the controller 510 can be configured to measure the voltage drop from the various contacts disposed on the touch-sensitive display 506. In some examples, the controller 510 can match the voltage drop from the signal 514 to that of the user display contact 526, thus further enabling the controller 510 to distinguish the user display contact 526 from other substances, such as the water droplet 532.

In addition to including a voltage drop, the first characteristic of the signal 514 can be configured to change the overall capacitance the controller 510 detects from the user display contact 526. For example, the signal 514 can be configure to add an electrical charge to the user 418. When the user 418 contacts the touch-sensitive display 506, the overall capacitance measured by the controller 510 from the user display contact 526 can be a different capacitance than if the user 418 contacted the touch-sensitive display 506 without simultaneously touching the electrode 508. In some examples, the new capacitance of the user display contact 526 can be configured to be different from the natural capacitive noise received by the controller 510 from sources such as the water droplet 532. Furthermore, the controller 510 can be configured to detect the new capacitance of the user display contact 526, therefore increasing the ability of the controller to distinguish the user display contact 526 from other substances.

Additionally, the controller 510 can be configured to distinguish a third characteristic from the second characteristic. In some examples, the third characteristic can include a feature of the user display contact 526. In some examples, the third feature of the contact can include the shape of the user display contact 526. In some examples, the shape of the user display contact 526 can be different in shape than other substances disposed on the touch-sensitive display such as the water droplet 532. In some examples, the controller 510 can be configured to compare the shapes of the different contacts on the touch-sensitive display 506 to further distinguish the user display contact 526 from other substances.

In one or more examples of the present disclosure, the third feature of the contact can include the size of the user display contact 526. In some examples, the user display contact 526 can have a size that is different from other substances disposed on the surface of the touch-sensitive display 506. For example, the user 418 may operate the electronic device 500 in a wet environment where water, like the water droplet 532 pictured, can contact the touch-sensitive display 506. In some examples, the water droplet 532 can be larger or smaller than the user display contact 526. In at least one example, the controller 510 can be configured to detect the size of the contacts on the touch-sensitive display 506 and link the contact with the size most similar to that of the user display contact 526 with input from the user 418. This can further enable the controller 510 to distinguish the third characteristic from the second characteristic.

In at least one example, the feature of the contact can include the location of the user display contact 526 on the touch-sensitive display 506. In some examples, the controller 510 can be configured to detect the location of different contacts on the surface of the touch-sensitive display 506. In one or more examples, the controller 510 can compare the location of the different contacts, (such as the user display contact 526 and the water droplet 532 shown in FIG. 5), with the content displayed on the touch-sensitive display 506. In some examples, if the position of the user display contact 526 coincides with content displayed on the touch-sensitive display 506, the controller 510 can further distinguish it from other contacts like the water droplet 532.

In some examples, the feature of the contact can include a force exerted on the touch-sensitive display by the user 418. In some examples, the touch-sensitive display 506 can further include a resistive touch sensor. In one or more examples, the resistive touch sensor of the touch-sensitive display 506 can be configured to detect forces exerted on the touch-sensitive display 506. Information on these exerted forces can be sent to the controller 510 for further analyzation.

In some examples, the user 418 can apply more or less pressure to the touch-sensitive display 506 than, for example, the water droplet 532. In some examples, the controller 510 can use this force information to further distinguish the user display contact 526 from other substances in contact with the electronic device 500. In some examples, the force information can be a more or less precise estimation of touch location, relative to the capacitive sensor. For example, the touch sensitive display 506 can be divide into quadrants, and the touch sensitive display can provide an indication of which quadrant the force is detected in. Smaller and larger divisions of the touch sensitive display 506 can also be utilized.

Furthermore, the controller 510 can be configured to use a machine learning algorithm to distinguish the third characteristic from the second characteristic of non-user substances such as the water droplet 532. In some examples, the machine learning algorithm can cause the controller 510 to adapt to fluctuations in detecting different features of the third characteristic. For example, the machine learning algorithm can enable the controller 510 to learn the average size of the user display contact 526, therefore increasing the ability of the controller 510 to distinguish the user display contact from other substances disposed on the touch-sensitive display 506. In some examples, the machine learning algorithm can enable the controller 510 to adapt to different circumstances for all of the features of the third characteristic described herein.

The components, configurations, and advantages described with reference to device shown in FIG. 5 can be included alone or in combination in any other device or system described herein with reference to other figures. Likewise, components, configurations, and advantages described in other devices or systems with reference to other figures can be included alone or in combination with those of device shown and described with reference to FIG. 5.

Figure 6:
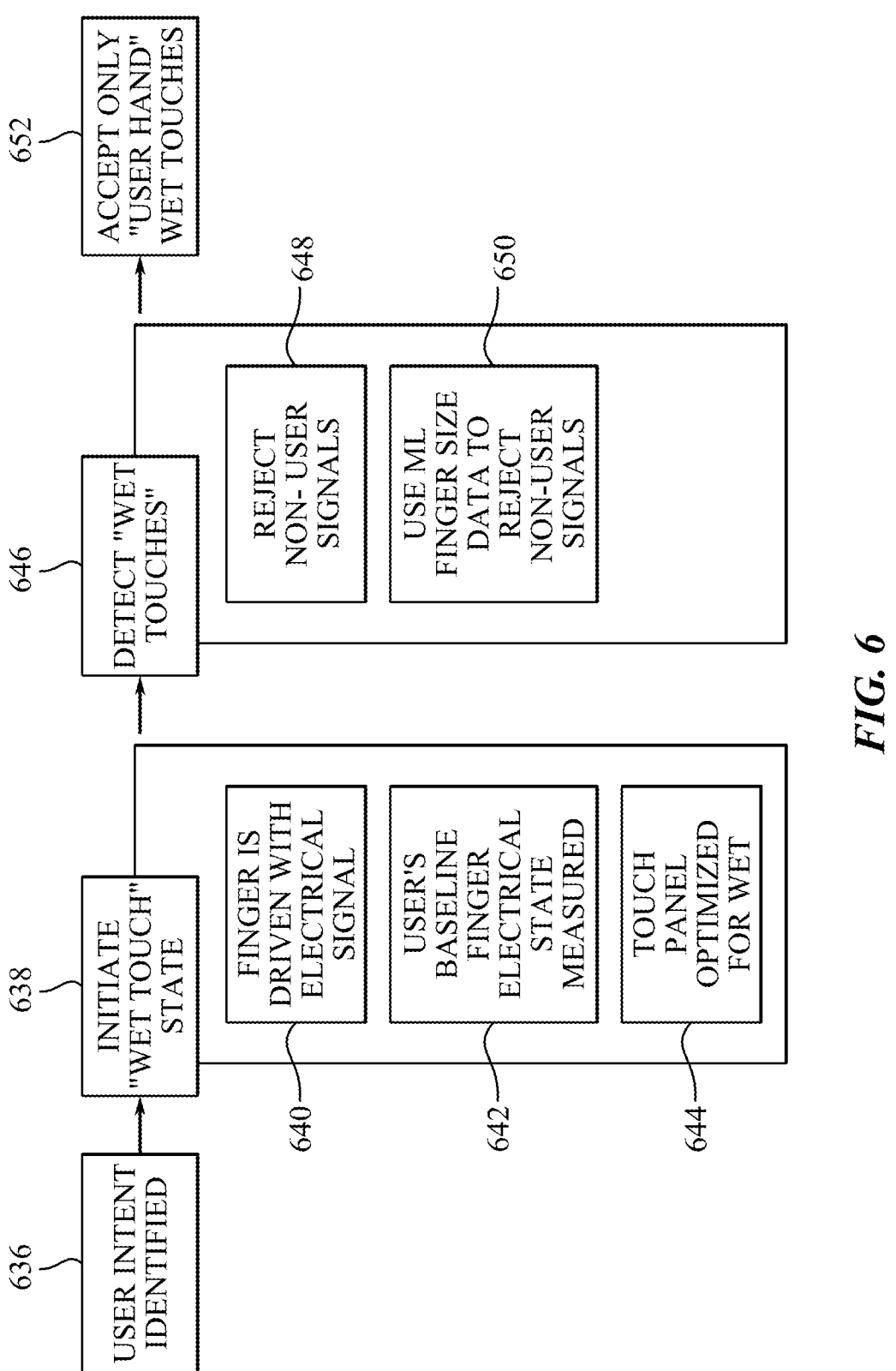
FIG. 6 shows a top-down view of the electronic device with different contact areas, according to one or more examples of the present disclosure.

FIG. 6 illustrates a block diagram describing one or more systems of the electronic device (e.g., device 100 in FIG. 1), in accordance with one or more examples of the present disclosure. In some examples, the controller (e.g., controller 110 in FIG. 1) can be configured to advance through a system, as shown in FIG. 6. In some examples, the controller 110 can begin with a user intent identified step 636. In at least one example, the user intent identified step 636 can include prompting the user (part 418 in FIG. 4) to disclose when the user 418 is in a situation where it can be beneficial to distinguish user input from other substances in contact with the electronic device 100. For example, the user 418 can acknowledge a wet environment with the intent of distinguishing user input from water disposed on the electronic device 100.

After the user intent identified step 636, the controller 110 can advance to an initiate wet touch state step 638. In some examples, the initiate wet touch state step 638 can configure the controller 110 to look for the signal (e.g., signal 114 in FIG. 1) when reading user input from the touch-sensitive display (e.g., touch sensitive display 106 in FIG. 1). In some examples, the electronic device 100 can wait for the initiate wet touch state step 638 before looking for the signal 114 when receiving user input. In other examples, the electronic device 100 can be configured such that the controller 110 always looks for the signal 114 when receiving user input.

In some examples, the initiate wet touch state step 638 can further include a number of additional steps. In at least one example, the initiate wet touch state step 638 can include a finger driven with electrical signal step 640. In this step, the controller 110 can drive the signal 114 to the electrode (e.g., electrode 108 in FIG. 1) and to the first finger (e.g., finger 320 in FIG. 3). In some examples, the signal 114 can travel through the hand of the user 418 and back through the second finger (e.g., finger 322 in FIG. 3). The signal 114 can then be detected by the controller 110 through the touch-sensitive display 106.

In one or more examples, the controller 110 can then advance to a user's baseline finger electrical state measured step 642. In this step, the controller 110 can be configured to measure the capacitance and/or voltage drop of the user input through the touch-sensitive display 106. Additionally, this state can include detecting the third feature of the user input, as described in FIG. 5.

In some examples, the controller 110 can then advance to a touch panel optimized for wet environments step 644. In this step, the controller 110 can further configure the touch-sensitive display 106 for wet conditions. In some examples, this can include configuring the controller 110 to detect the user input and/or using the machine learning algorithm described in FIG. 5 to teach the controller 110 how to better detect the user input based on characteristics of the signal 114 and characteristics of the user display contact (e.g., contact 526 in FIG. 5).

In some examples of the present disclosure, the controller 110 can then advance to a detect wet touches step 646. This step can include a number of integrated steps that can enable the controller 110 to distinguish wet contacts on the touch-sensitive display 106 from the user input. In some examples, the detect wet touches step 646 can include a reject non-user signals step 648. This step can include the controller 110 being configured to compare the signals received from non-user substances with the signal 114 received with the user display contact 526.

Additionally, the detect wet touches step 646 can include a use machine learning (ML) finger size and/or shape data to reject non-user signals step 650. This step can include using machine learning to further distinguish characteristics of the user input from characteristics of non-user substances.

In at least one example, the controller 110 can then advance to an accept only user hand wet touches step 652. This step can enable the controller 110 to reject the touches detected by non-user substances. This can enable the electronic device 100 to accept only user-intended input through the touch-sensitive display 106.

The components, configurations, and advantages described with reference to device shown in FIG. 6 can be included alone or in combination in any other device or system described herein with reference to other figures. Likewise, components, configurations, and advantages described in other devices or systems with reference to other figures can be included alone or in combination with those of device shown and described with reference to FIG. 6.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, X® (formerly TWITTER®) ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device, comprising:
a display;
an electrode configured to receive a first signal associated with performing a first function of the electronic device; and
a controller in electrical communication with the display and the electrode, the controller configured to perform a second function, the second function including driving a second signal to the electrode when the electrode and the display are touched simultaneously, the second signal having a characteristic distinguishable from capacitive noise detected by the display.

2. The electronic device of claim 1, further comprising a housing defining an external surface and electrically isolated from the display, wherein:
the controller is disposed within the housing;
the electrode comprises the housing; and
the first function includes an antenna function.

3. The electronic device of claim 1, wherein:
the electronic device further comprises a housing coupled to the display; and
the electrode comprises a button electrically isolated from and manipulate-able relative to the housing.

4. The electronic device of claim 1, further comprising:
a housing coupled to the display;
a rear cover coupled to the housing opposite the display, the rear cover comprising the electrode; and
the first function includes detecting if a user is donning the electronic device.

5. The electronic device of claim 1, wherein the characteristic of the second signal includes a frequency.

6. The electronic device of claim 1, wherein the capacitive noise includes a capacitive signal from a droplet of water disposed on the display.

7. The electronic device of claim 1, wherein:
the display defines an external surface; and
the electrode defines the external surface.

8. The electronic device of claim 7, wherein:
the controller is configured to drive the second signal through the electrode to the display when a user simultaneously touches the electrode and the display; and the controller detects the characteristic through the display.

9. An electronic display device, comprising:
a touch sensor;
an electrode; and
a controller in electrical communication with the touch sensor and the electrode, the controller configured to drive a signal to the electrode, the signal having a characteristic distinguishable from capacitive noise detected at the touch sensor;
wherein the controller is configured to drive the signal to the touch sensor when the electrode and the touch sensor are simultaneously touched.

10. The electronic display device of claim 9, wherein the touch sensor comprises a capacitive touch sensor.

11. The electronic display device of claim 10, wherein the controller comprises:
a driver configured to drive the signal to the electrode; and
a receiver in electrical communication with the capacitive touch sensor and configured to detect the characteristic.

12. The electronic display device of claim 9, wherein the characteristic includes a variable voltage drop.

13. The electronic display device of claim 9, wherein the characteristic includes a variable frequency.

14. A sensor assembly, comprising:
a display;
an electrode electrically isolated from the display;
a controller in electrical communication with the display and the electrode, the controller configured to drive a first signal to the electrode;
wherein:
the first signal includes a first characteristic distinguishable by the controller from a second characteristic of a second signal detected when water contacts the display; and
the controller is configured to distinguish a third characteristic from the second characteristic, the third characteristic including a feature of the contact.

15. The sensor assembly of claim 14, wherein the feature of the contact includes a shape of a contact area between a finger of a user and the display.

16. The sensor assembly of claim 15, wherein the feature of the contact includes a size of the contact area between the finger of the user and the display.

17. The sensor assembly of claim 15, wherein the feature of the contact includes a location of the contact area on the display.

18. The sensor assembly of claim 14, wherein the feature of the contact includes a force exerted on the display by a user.

19. The sensor assembly of claim 14, wherein the controller is further configured to use a machine learning algorithm to distinguish the third characteristic from the second characteristic.

20. The sensor assembly of claim 14, wherein:
the display is coupled to a housing; and
the electrode comprises a button manipulate-able relative to the housing.

* * * * *